(12) United States Patent
Bewlay et al.

(10) Patent No.: US 7,981,520 B2
(45) Date of Patent: Jul. 19, 2011

(54) OXIDE-FORMING PROTECTIVE COATINGS FOR NIOBIUM-BASED MATERIALS

(75) Inventors: Bernard Patrick Bewlay, Niskayuna, NY (US); Pazhayannur Ramanathan Subramanian, Niskayuna, NY (US); Joseph David Rigney, Milford, OH (US); Richard DiDomizio, Scotia, NY (US); Voramon Supatarawanich Dheeradhada, Latham, NY (US)

(73) Assignee: General Electric Company, Niskayuna, NY (US)

( * ) Notice: Subject to any disclaimer, the term of this patent is extended or adjusted under 35 U.S.C. 154(b) by 137 days.

(21) Appl. No.: 12/238,675

(22) Filed: Sep. 26, 2008

(65) Prior Publication Data

US 2009/0042056 A1 Feb. 12, 2009

Related U.S. Application Data

(63) Continuation-in-part of application No. 11/835,672, filed on Aug. 8, 2007.

(51) Int. Cl.
*B32B 15/01* (2006.01)
*C22C 27/02* (2006.01)

(52) U.S. Cl. ........ 428/632; 428/472; 428/641; 428/651; 428/660; 428/662

(58) Field of Classification Search ............... None
See application file for complete search history.

(56) References Cited

U.S. PATENT DOCUMENTS

| | | | |
|---|---|---|---|
| 2,822,268 A * | 2/1958 | Hix | 420/426 |
| 4,956,144 A * | 9/1990 | Jackson et al. | 420/580 |
| 4,983,358 A * | 1/1991 | Hebsur et al. | 420/425 |
| 4,990,308 A * | 2/1991 | Jackson | 420/426 |
| 5,006,307 A * | 4/1991 | Jackson | 420/426 |
| 5,296,309 A * | 3/1994 | Benz et al. | 428/614 |
| 5,316,865 A * | 5/1994 | Benz et al. | 428/614 |
| 5,366,565 A * | 11/1994 | Jackson | 148/426 |
| 5,741,376 A | 4/1998 | Subramanian et al. | |
| 5,833,773 A | 11/1998 | Bewlay et al. | |
| 5,932,033 A | 8/1999 | Jackson et al. | |
| 5,942,055 A | 8/1999 | Jackson et al. | |
| 6,409,848 B1 | 6/2002 | Bewlay et al. | |
| 6,419,765 B1 | 7/2002 | Jackson et al. | |
| 6,428,910 B1 | 8/2002 | Jackson et al. | |
| 6,447,623 B1 | 9/2002 | Jackson et al. | |
| 6,521,356 B2 * | 2/2003 | Zhao et al. | 428/632 |
| 6,645,560 B2 * | 11/2003 | Zhao et al. | 427/376.1 |
| 6,676,381 B2 | 1/2004 | Subramanian et al. | |
| 6,913,655 B2 * | 7/2005 | Jackson et al. | 148/422 |
| 7,296,616 B2 * | 11/2007 | Bewlay et al. | 164/519 |

(Continued)

OTHER PUBLICATIONS

M.P. Brady et al.; "Oxidation resistance and mechanical properties of Laves phase reinforced Cr in-situ composites"; Intermetallics, (2000), vol. 8, No. 9, pp. 1111-1118.

(Continued)

*Primary Examiner* — Aaron Austin
(74) *Attorney, Agent, or Firm* — Scott J. Asmus

(57) ABSTRACT

A coating suitable for use as protective oxide-forming coatings on Nb-based substrates, and particularly monolithic niobium-based alloys, exposed to high temperatures and oxidative environments. The coating contains aluminum, may further contain silicon, and optionally contains niobium, titanium, hafnium, and/or chromium, which in combination form one or more intermetallic phases that promote the formation of a slow-growing oxide scale. The intermetallic phases may be $M(Al,Si)_3$, $M_5(Al,Si)_3$, and/or $M_3Si_5Al_2$ where M is niobium, titanium, hafnium, and/or chromium.

17 Claims, 2 Drawing Sheets

U.S. PATENT DOCUMENTS

| | | | |
|---|---|---|---|
| 7,497,986 B2 * | 3/2009 | Bewlay et al. | 266/201 |
| 7,704,335 B2 * | 4/2010 | Bewlay et al. | 148/422 |
| 2002/0192491 A1 | 12/2002 | Zhao et al. | |
| 2006/0042725 A1 * | 3/2006 | Bewlay et al. | 148/237 |
| 2006/0147335 A1 * | 7/2006 | Bewlay et al. | 420/425 |
| 2007/0181278 A1 * | 8/2007 | Bancheri et al. | 164/132 |
| 2009/0042054 A1 | 2/2009 | Bewlay et al. | |

OTHER PUBLICATIONS

M.P. Bradyd et al.; "High-Temperature Oxidation and Corrosion of Intermetallics"; from Materials Sci. & Techn. (2000); vol. II; Chap. 6, pp. 279-284. Wiley-VCH: Weinheim DE.

J. Doychak & M.G. Hebsur; "Protective Al2O3 Scale Formation on NbAl3-Base Alloys"; Oxidation of Metals (1991) vol. 36, Nos. 1/2; pp. 113-141.

M.B. Hebsur et al.; "Influence of Alloying Elements on the Oxidation Behavior of NbAl3"; Oxidation of High-Temperature Intermetallics (1989); pp. 171-183, Warrendale, PA.

S. Priceman et al.; "Fused Slurry Silicide Coatings for the Elevated Temperature Oxidation of Columbium Alloys", Met. Soc. Conf. (1967), vol. 41, pp. 959-982.

S. Priceman et al.; "Reliable, Practical, Protective Coatings for Refractory Metals Formed . . . Fusion of Silicon Alloy Slurries", Electrochemical Techn., (1968), vol. 6, p. 315.

* cited by examiner

OXIDE-FORMING PROTECTIVE COATINGS FOR NIOBIUM-BASED MATERIALS

This is a continuation-in-part patent application of co-pending U.S. patent application Ser. No. 11/835,672, filed Aug. 8, 2007. The contents of this prior application are incorporated herein by reference.

BACKGROUND OF THE INVENTION

This invention generally relates to coatings suitable for protecting components exposed to high-temperature environments, such as the hot gas flow path through a gas turbine engine. More particularly, this invention is directed to coatings that impart oxidation resistance to niobium-based materials, and particularly monolithic niobium-based alloys.

Higher operating temperatures for gas turbine engines are continuously sought in order to increase their efficiency. While nickel, cobalt and iron-based superalloys have found wide use for components within the hot sections of gas turbine engines, alternative materials have been proposed to achieve improved high-temperature properties. For example, refractory metal alloys and intermetallic materials have been proposed as candidates for high temperature applications, such as blades, nozzles, vanes, shrouds, afterburner components, and other hot gas path components of gas turbine engines. Examples include monolithic refractory metal alloys and refractory metal intermetallic composite (RMIC) materials, including alloys based on niobium, titanium, hafnium and zirconium. A notable example of an RMIC is niobium silicide (Nb—Si) alloys, which may further contain other alloying constituents, including titanium, hafnium, aluminum, chromium, etc. Nb-based RMICs usually have a microstructure containing a metallic Nb-based phase and one or more intermetallic phases, for example, an intermetallic niobium-silicide (NbSi) phase that forms in-situ during solidification of the alloy. The niobium-based phase is relatively ductile, while the intermetallic phase is brittle and stronger to contribute strength, fracture toughness and other desirable mechanical properties. In contrast to niobium silicide alloys and other Nb-based RMICs, monolithic Nb-based alloys (as the term is used herein) are essentially free of strengthening phases such as silicides and other intermetallic phases.

The above-noted compositions are termed Nb-based in that their predominant constituent is niobium; in other words, the material contains more niobium than any other individual constituent. Depending on the particular composition, niobium-based alloys and RMICs can have much greater temperature capabilities than existing nickel, cobalt, and iron-based superalloys.

Nb-based RMICs and monolithic Nb-based alloys have become of particular interest for replacing superalloys in the hot sections of turbine engines because they are capable of possessing a promising combination of low-temperature mechanical properties, such as room temperature toughness, as well as high-temperature strength and creep resistance. However, a significant impediment to the development of Nb-based alloys and RMICs for high-temperature applications in aircraft engines is their oxidation resistance. Existing nickel, cobalt, and iron-based superalloys exposed to high-temperature oxidation environments are often protected with an oxidation-resistant coating that forms a protective oxide film during high temperature exposure in air. The oxide film, commonly referred to as an oxide scale and often an aluminum oxide (alumina, $Al_2O_3$) or chromium oxide (chromia, $Cr_2O_3$), inhibits oxidation of the coating and the underlying substrate. Nb-based materials intended for use in high-temperature oxidizing environments have been protected with oxidation-resistant coatings, for example, Si—Cr—Ti and Si—Cr—Fe silicide coatings, to improve their oxidation resistance. These coatings are interdiffused and form a large diffusion zone. The oxide scale formed by these coating compositions is a complex oxide that does not always exhibit a slow parabolic mass gain with time, represented by the equation:

$$(\Delta m)^2 = k_p t$$

where $\Delta m$ is the specific weight increase, t is time, and $k_p$ is a kinetic constant (always positive).

In an effort to provide improved coatings that exhibit a lower oxide growth rate, a significant body of work has been directed at using aluminum interdiffusion to produce a Nb—Al compound capable of forming a protective alumina scale. However, the sustained formation of alumina scale has not been achieved in these attempts, and to date aluminum-based coatings suitable for protecting Nb alloys has not been practical.

Another result of the interdiffusion process used to form Si—Cr—Ti or Si—Cr—Fe coatings is that a significant number of vertical cracks form in the coating, often in excess of one hundred vertical cracks per inch, when formed on Nb—Si composites. These cracks are termed "vertical" because they extend through the interdiffused coating in a direction that is roughly perpendicular to the coating/substrate interface. FIG. 3 shows three cross-sections of a Nb-based substrate coated with a Si—Cr—Fe coating commercially known as R512E (by weight, 60Si-20Cr-20Fe), in which cracks are visible and extend from the coating surface all the way into the substrate material, creating a path through which the substrate material is directly exposed to the oxidative environment. Oxides that form in the vertical cracks during high temperature exposure cause the cracks to wedge open, increasing the depth of the cracks into the substrate. As also shown in FIG. 3, with sufficient exposure time the cracks may be deflected at the coating/substrate interface and run along the interface, producing a wedging effect between the coating and substrate. Ultimately, the coating spalls because the crack-opening effect caused by oxidation exposes the substrate material directly to the oxidative environment.

Vertical cracks in Si—Cr—Ti or Si—Cr—Fe coatings are due in part to the interdiffused coating having a significantly larger coefficient of thermal expansion (CTE) than the substrate material, for example, 50% higher or more. The high CTEs of the Si—Cr—Ti and Si—Cr—Fe coatings are attributable to the silicides that form during the interdiffusion process, for example, $Ti_5Si_3$ (CTE of about 11.5 ppm/° C.), $TiSi_2$ (CTE of about 12 ppm/° C.), and $CrSi_2$ (CTE of about 14 ppm/° C.), whose CTEs are significantly greater than that of Nb—Si materials. A CTE difference between the coating and substrate of less than 10% would be desirable for reducing and potentially eliminating vertical crack formation.

In view of the above, coating compositions and methods are desired for coatings capable of improving the high temperature performance of Nb-based materials.

BRIEF DESCRIPTION OF THE INVENTION

The present invention provides a coating suitable for use as a protective oxide-forming coating on Nb-based substrates, and particularly Nb-based surfaces of articles exposed to high temperatures and oxidative environments, including the hostile environment of a gas turbine engine. Examples of Nb-based substrate materials include but are not limited to monolithic niobium-based alloys and niobium-based RMICs, the latter of which includes niobium-silicide (Nb—Si) composites.

According to one aspect of the invention, a coating is provided that is capable of promoting the oxidation resistance of a surface of a niobium-based substrate, such as a monolithic niobium-based alloy. The coating contains aluminum, may further contain silicon, and contains niobium, titanium, hafnium, and/or chromium, which in combination form at least one intermetallic phase chosen from the group consisting of $M(Al,Si)_3$, $M_5(Al,Si)_3$, and $M_3Si_5Al_2$ where M is niobium, titanium, hafnium, and/or chromium.

According to a particular aspect of the invention, the coating may be formed by an overlay process. The process entails an overlay deposition technique that deposits an aluminum-containing layer on the substrate, optionally followed by a heat treatment.

According to still another aspect of the invention, a gas turbine engine component is provided having a substrate formed of a niobium-based material, such as a monolithic niobium-based alloy. A coating formed of the above-noted aluminum-containing composition is provided on the substrate surface to promote the oxidation resistance of the substrate. Finally, an aluminum oxide (alumina; $Al_2O_3$) scale is present on a surface of the coating.

A significant advantage of this invention is that the coating composition is capable of significantly improving the oxidation resistance of components formed of Nb-based substrates, and particularly monolithic niobium-based alloys. The coating is a self-sustaining alumina former, whose protective alumina scale exhibits a desirable slow parabolic mass gain with time.

Other objects and advantages of this invention will be better appreciated from the following detailed description.

DETAILED DESCRIPTION OF THE INVENTION

Figure 1:
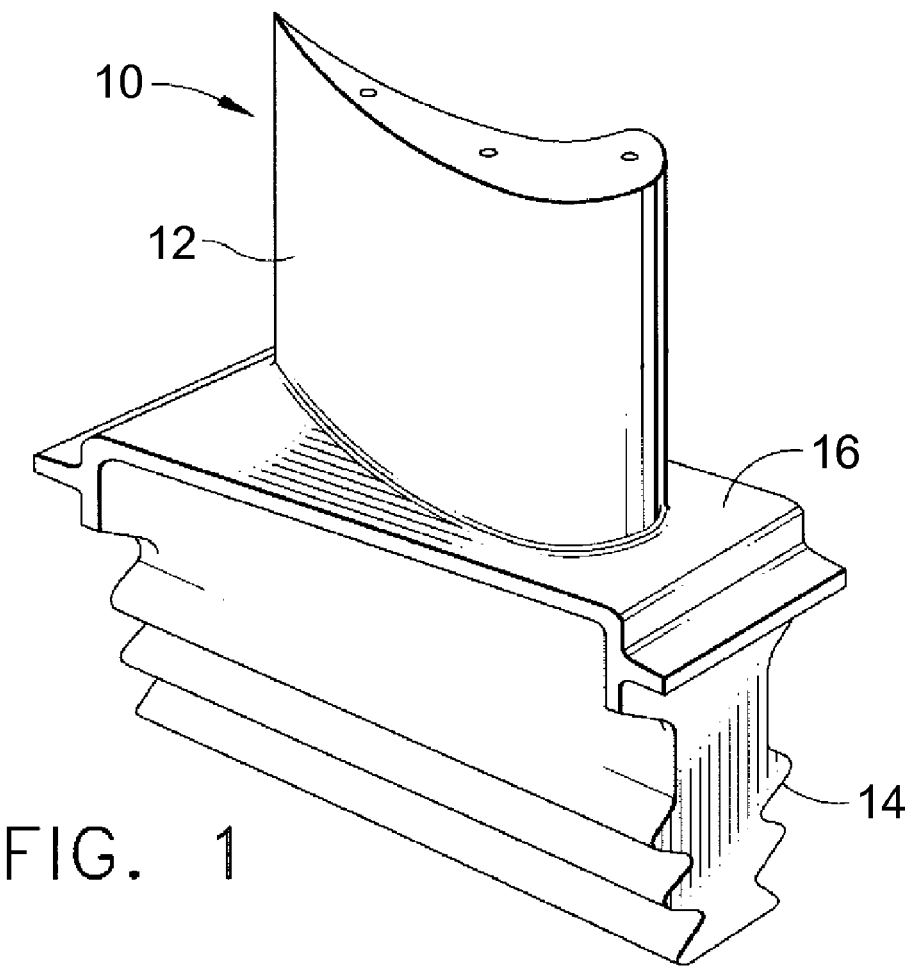
FIG. 1 shows a turbine blade of a gas turbine engine, and is representative of gas turbine engine components that can be formed of niobium-based materials.

The present invention is generally applicable to components that operate within environments characterized by relatively high temperatures and subjected to severe oxidation. Notable examples of such components include blades, nozzles, vanes, shrouds, afterburner components, and other components within the hot gas flow path of gas turbine engines. One such example is the high pressure turbine blade 10 shown in FIG. 1. The blade 10, which is typically in the form of a casting, and generally includes an airfoil 12 against which hot combustion gases are directed during operation of the gas turbine engine, and whose surface is therefore subjected to severe attack by oxidation, corrosion and erosion. A platform 16 separates the airfoil 12 from a dovetail 14 formed on a root section of the blade 10, by which the airfoil 12 is anchored to a turbine disk (not shown). While the advantages of this invention will be described with reference to the turbine blade 10 shown in FIG. 1, the teachings of this invention are generally applicable to other components on which a coating system is desired to protect the component from its environment.

Figure 2:
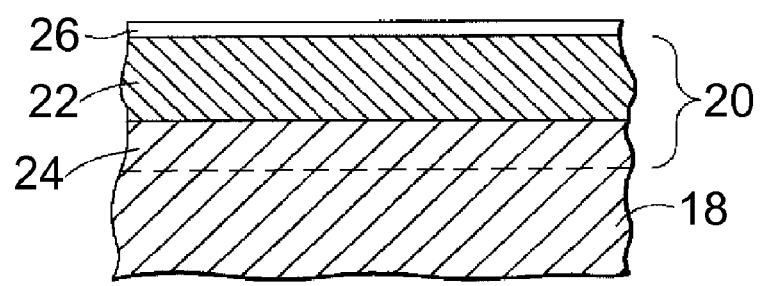
FIG. 2 schematically represents a fragmentary cross-sectional view of a surface region of the blade of FIG. 1, and shows a protective overlay coating on a surface of the blade in accordance with this invention.
Figure 3:
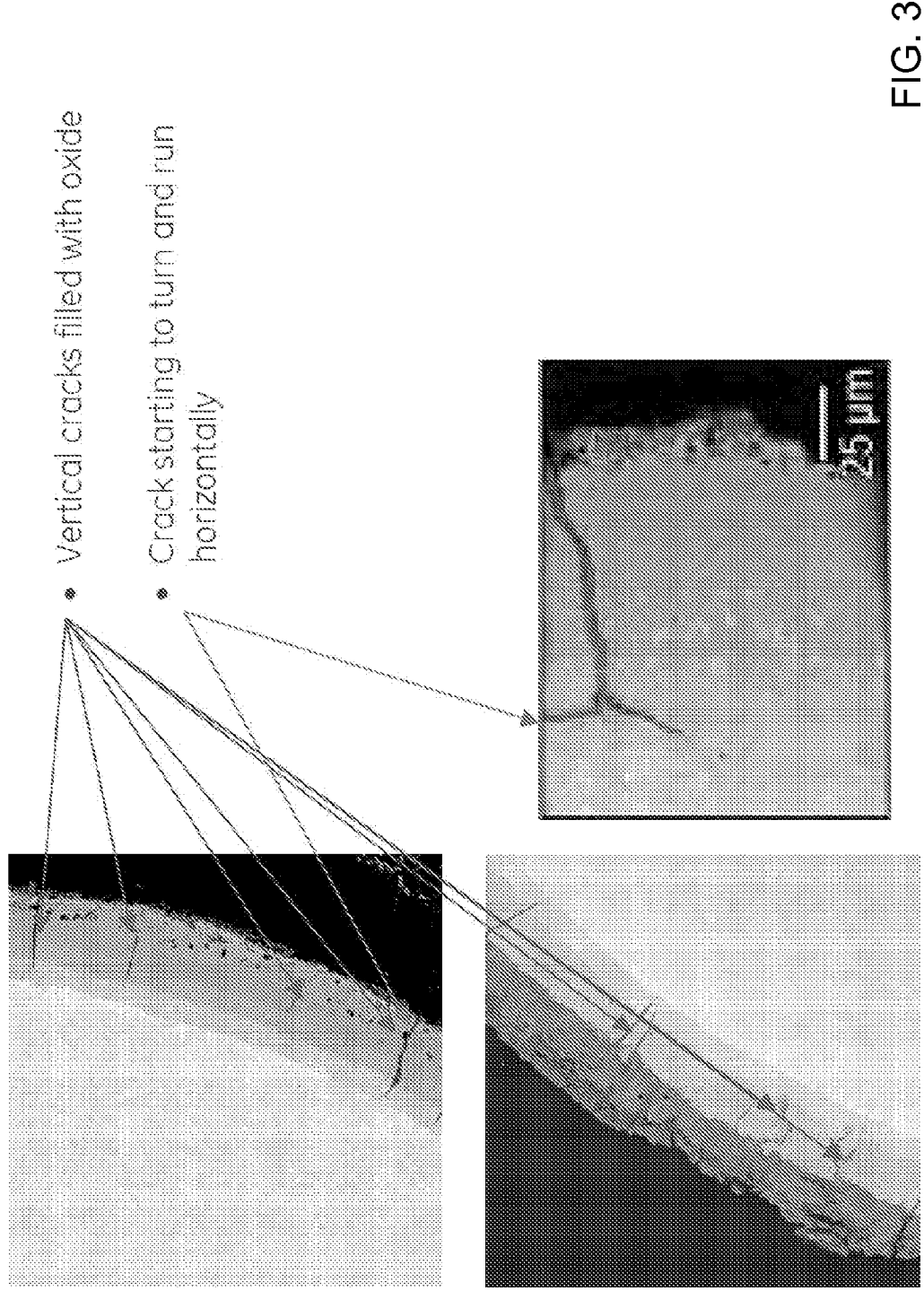
FIG. 3 shows three scanned images of cross-sections through a Nb-based substrate coated with a prior art Si—Cr—Fe silicide coating.

A surface region 18 of the blade 10 is represented in FIG. 2 for purposes of illustrating the invention. The blade 10, or at least its surface region 18, is preferably formed of a niobium-based material, such as a monolithic niobium-based alloy, though other niobium-based alloys or niobium-based RMIC materials are also within the scope of the invention. As shown in FIG. 2, the surface region 18 of the blade 10 is protected by an overlay coating 20. The overlay coating 20 may define the outermost surface of the blade 10, or may be overcoated with additional coatings, including a thermal barrier coating. The overlay coating 20 provides environmental protection to the underlying surface region 18, thereby enabling the blade 10 to survive within higher temperature environments than otherwise possible. An optional outer coating, such as a thermal barrier coating (TBC) or environmental barrier coating (EBC), may overlay the coating 20 to provide additional thermal and/or environmental protection for the blade 10.

According to a particular aspect of the invention, the overlay coating 10 is specially formulated for protecting substrates formed of monolithic niobium-based alloys. Generally, monolithic Nb-based alloys of particular interest to the invention may contain, by weight, up to 5% aluminum, up to 1% carbon, up to 5% cobalt, up to 20% chromium, up to 5% iron, up to 10% hafnium, up to 3% manganese, up to 15% molybdenum, up to 0.2% silicon, up to 30% tantalum, up to 20% titanium, up to 8% vanadium, up to 15% tungsten, and up to 10% zirconium, up to 5% of a rare earth element, up to 25% of a platinum group metal, the balance niobium and incidental impurities. The inclusion and amounts used of any of these elements will depend on a variety of factors, such as the desired properties for the final alloy product, and generally all such compositions are within the scope of the invention.

Aside from monolithic Nb-based alloys of particular interest to the invention, other Nb-based materials of interest include niobium-based RMICs reinforced with an intermetallic phase, specific examples of which include NbSi alloys having a microstructure containing a niobium-silicide strengthening phase (and optionally other intermetallic silicide phases) within a metallic Nb-based matrix phase. Examples of notable NbSi RMICs are disclosed in U.S. Pat. Nos. 5,833,773 to Bewlay et al., 5,932,033 to Jackson et al., 6,409,848 to Bewlay et al., 6,419,765 to Jackson et al., 6,676,381 to Subramanian et al., 6,913,655 to Jackson et al., and 7,296,616 to Bewlay et al., and U.S. Published Patent Application Nos. 2006/0042725 to Bewlay et al. and 2007/0181278 to Bancheri et al. The contents of these patent documents relating to niobium-based materials, including their compositions and processing, are incorporated herein by reference. The amount and composition of the silicide phase within the NbSi alloy can vary significantly, as described in U.S. Published Patent Application No. 2006/0042725 to Bewlay et al. The silicide phase may be, for example, $M_3Si$ or $M_5Si_3$, where M is Nb, Ti, and/or Hf, depending on the particular composition of the alloy. The microstructure of the alloy may contain other phases as well, including laves (intermetallic) phases such as $Cr_2Nb$.

The overlay coating 20 is represented in FIG. 2 as having an overlay region 22 on the surface of the region 18, and a limited diffusion zone 24 that extends into the surface region 18. As discussed below, the presence and extent of the diffusion zone 24 is limited by the overlay process used to deposit the coating 20. The coating 20 is further represented as having developed an oxide scale 26 that promotes the oxidation resistance of the coating 20 and the underlying surface region 18. The oxide scale 26 inherently grows from the compositions of the coating 20, but can also be promoted by appropriate thermal processing of the coating 20.

The overlay coating 20 can be deposited by a number of overlay deposition processes, for example, physical vapor deposition (PVD), air plasma spray (APS), vacuum plasma spray (VPS), low pressure plasma spray (LPPS), high velocity oxy-fuel (HVOF), high velocity air-fuel (HVAF), ion plasma deposition (IPD), and/or sputtering, which form what is termed herein an "overlay" coating with minimal interdiffusion with the surface region 18. The overlay coating 20 is deposited to contain aluminum, may be deposited to further contain silicon, and may be deposited to contain additional constituents, for example, niobium, titanium, hafnium, and/or chromium. The constituents of the coating 20 are present as specific intermetallic phases identified by this invention as capable of promoting the formation of a continuous oxide scale 26 that exhibits a slow parabolic mass gain with time. In particular, the coating 20 is deposited and processed to contain a dispersion of two or more of the following intermetallic phases: $M(Al,Si)_3$, $M_5(Al,Si)_3$, and $M_3Si_5Al_2$, where M is niobium, titanium, hafnium, and/or chromium. Each of these phases enables the coating 20 to act as a self-sustaining alumina ($Al_2O_3$) former. Suitable thicknesses for the coating 20 are believed to be about 25 to 500 micrometers, with a thickness of about 50 to 150 micrometers believed to be particularly desirable.

While the coating 20 of FIG. 2 is represented and described as an overlay coating, diffusion coatings containing the same intermetallic phases are also within the scope of this invention. A wide variety of diffusion deposition processes are known, including but not limited to slurry methods, pack cementation, vapor (gas) phase deposition (such as vapor phase aluminizing), and chemical vapor deposition (CVD). Coatings formed by overlay deposition processes are distinguishable from coatings formed by diffusion deposition processes, in that significant interdiffusion with the Nb-based surface region 18 (for example, a diffusion zone 24 of more than fifty micrometers) is not required to react the deposited material with the substrate material to form the desired intermetallic phases, as is the case if the coating 20 is formed by a diffusion process. An example of the latter generally entails depositing an aluminum-containing composition on the surface region 18 and interdiffusing the deposited composition with the surface region 18 to form the desired intermetallic phases in situ. The significant interaction with the surface region 18 associated with forming such a diffusion coating creates an extensive diffusion zone that contains various intermetallic and metastable phases as a result of diffusional gradients and changes in elemental solubility in the local region of the substrate. As such, if the coating 20 is to be a diffusion coating and contain $MSi_3$ (as the $M(Al,Si)_3$ intermetallic phase), or $M_5Si_3$ (as the $M_5(Al,Si)_3$ intermetallic phase), or $M_3Si_5Al_2$, silicon must be intentionally deposited in the absence of adequate silicon in the surface region 18 to form these phases. The diffusion zone of a diffusion coating may extend 250 micrometers or more into the surface region 18, though thinner diffusion zones will typically be more desirable.

In contrast, overlay deposition processes entail directly depositing the desired coating composition (including intermetallic phases) on the surface region 18, and the coating 20 predominantly retains its as deposited composition. Prior to deposition, the intermetallic phases can be formed by melting or otherwise alloying a composition comprising the "M" constituent(s) of the intermetallic phases with a source of aluminum and optionally a source of silicon in appropriate amounts to form the desired $M(Al,Si)_3$, $M_5(Al,Si)_3$, and/or $M_3Si_5Al_2$ phases. For instance, to form $NbAl_3$ intermetallic as the $M(Al,Si)_3$ phase, niobium and aluminum (including suitable sources thereof) are combined to substantially achieve the stoichiometric ratio (Nb:Al atomic ratio of 1:3), and then melted or otherwise alloyed so that niobium and aluminum react to form the intermetallic. Each source for the desired constituents of the intermetallic phases(s) is preferably zerovalent, elemental, or in metallic or alloy form, although the use of compounds is also within the scope of the invention provided that each can be sufficiently reduced to react and form the required phase(s). Methods of melting or otherwise alloying metals and/or metalloids are generally known in the field, and can include melting the desired composition as a bulk ingot. Depending on the particular overlay deposition process used, the ingot can be machined to form a target (for example, for deposition by sputtering) or processed to form a powder (for example, for deposition by plasma spraying).

Following deposition, the overlay coating 20 can be heat treated to homogenize the coating 20 to ensure phase formation/stabilization. Such heat treatments will also tend to cause some diffusion of the overlay coating 20 into the substrate to ensure intimate contact with the surface region 18, but without significantly altering the phase composition of the coating 20. A suitable heat treatment is at a temperature of about 1200° C. to about 1500° C. for a sufficiently short duration to limit interdiffusion between the coating 20 and surface region 18. As a result, the limited diffusion zone 24 will typically extend less than fifty micrometers into the surface region 18, and the overlay region 22 above the surface of the region 18 will predominantly retain its as-deposited composition.

When present in proper volume fractions (see Table I), the $M(Al,Si)_3$, $M_5(Al,Si)_3$, and/or $M_3Si_5Al_2$ intermetallic phases have been shown to form a continuous, self-sustaining $Al_2O_3$ scale 26 capable of imparting oxidation resistance to the niobium-based surface region 18 (and other niobium-based alloys and composites, especially Nb—Si composites), extending the life of the blade 10 during high temperature operating conditions. Furthermore, the composition of the coating 20 and its oxide scale 26 enable the blade 10 to operate at higher temperatures in the hot gas path of a gas turbine engine than nickel-based superalloys, leading to improvements in efficiency and specific fuel consumption. The alumina oxide scale 26 of the coating 20 also exhibits a significantly better response when exposed to high temperature water vapor than the complex oxide scale of conventional Si-based coatings (Si—Cr—Ti and Si—Cr—Fe). Whereas the prior art Si-based coatings exhibit a significant increase in weight gain and/or coating failure when exposed to high temperature water vapor, the coating 20 exhibits essentially the same performance whether exposed to high temperature water vapor or high temperature ambient air, and its alumina oxide scale 26 continues to show the desirable parabolic mass gain behavior. Because water vapor is inherently present in the hot gas path of gas turbine engines, the alumina-forming coating 20 provides a significant advantage.

The successful development of a coating capable of a self-sustaining alumina oxide scale 26 on a niobium-based alloy or composite is contrary to conventional teachings. The ability of the coating 20 to form a self-sustaining alumina oxide scale 26 is attributed to the types and approximate relative amounts (by volume percent) of the intermetallic phases in the coating 20, as summarized in Table I below. As previously noted, an overlay deposition process can be used to deposit aluminum and other constituents of the coating 20 in amounts that will form the intermetallic phases in the amounts identified in Table I. Within the coating 20, the $M_5(Al,Si)_3$ and/or $M_3Si_5Al_2$ intermetallic phases are generally dispersed in a matrix formed by the predominant $M(Al,Si)_3$ phase.

TABLE I

| Phases | Broad | Narrow | Narrower |
|---|---|---|---|
| $M(Al,Si)_3$ | 0-90 | 40-90 | 50-90 |
| $M_5(Al,Si)_3$ | 0-50 | 5-40 | 5-30 |
| $M_3Si_5Al_2$ | 0-30 | 1-25 | 1-20 |

Approximate chemistries (by atomic percent) capable of producing overlay coatings 20 having the above phases and amounts are summarized in Table II below.

TABLE II

| Constituents | Broader | Narrower |
|---|---|---|
| Aluminum | 1-75 | 25-70 |
| Silicon | 1-50 | 25-45 |
| Niobium | 25-63 | 30-40 |
| Titanium | 0-40 | 10-30 |
| Hafnium | 0-15 | 1-10 |
| Chromium | 0-10 | 5-10 |

The presence of aluminum in the coating 20 and the amounts used are intended to form the above-noted intermetallic phases, as well as develop and maintain the desired alumina oxide scale 26. The inclusion of hafnium in the coating 20 is capable of promoting the chemical compatibility of the coating 20 with Nb-based alloy and Nb—Si composite substrates.

While the invention has been described in terms of certain embodiments, it is apparent that other forms could be adopted by one skilled in the art. Therefore, the scope of the invention is to be limited only by the following claims.

The invention claimed is:

1. A coating capable of promoting the oxidation resistance of a surface of a niobium-based substrate, the coating consisting of aluminum, silicon, and at least one of niobium, titanium, hafnium, and chromium, the coating consisting essentially of about 40 to about 90 volume percent of $M(Al,Si)_3$ intermetallic phase, about 5 to about 40 volume percent of $M_5(Al,Si)_3$ intermetallic phase, and about 1 to about 25 volume percent of $M_3Si_5Al_2$ intermetallic phase, where M is niobium, titanium, hafnium, and/or chromium.

2. The coating according to claim 1, wherein the coating consists essentially of about 50 to about 90 volume percent of the $M(Al,Si)_3$ intermetallic phase, about 5 to about 30 volume percent of the $M_5(Al,Si)_3$ intermetallic phase, and about 1 to about 20 volume percent of the $M_3Si_5Al_2$ intermetallic phase.

3. The coating according to claim 1, wherein the coating is an overlay coating.

4. The coating according to claim 1, wherein the coating is a diffusion coating.

5. The coating according to claim 1, wherein the coating has an oxide scale on a surface thereof that is predominantly alumina.

6. The coating according to claim 1, wherein the coating intimately contacts the surface of the niobium-based substrate.

7. The coating according to claim 1, wherein the niobium-based substrate is a monolithic niobium-based alloy.

8. The coating according to claim 7, wherein the monolithic niobium-based alloy has a composition consisting of, by weight, up to 5% aluminum, up to 1% carbon, up to 5% cobalt, up to 20% chromium, up to 5% iron, up to 10% hafnium, up to 3% manganese, up to 15% molybdenum, up to 0.2% silicon, up to 30% tantalum, up to 20% titanium, up to 8% vanadium, up to 15% tungsten, and up to 10% zirconium, up to 5% of a rare earth element, up to 25% of a platinum group metal, the balance niobium and incidental impurities.

9. The coating according to claim 1, wherein the substrate is a component of a gas turbine engine.

10. A gas turbine engine component comprising:
   a substrate formed of a monolithic niobium-based alloy;
   an overlay coating on the substrate and capable of promoting the oxidation resistance of a surface of the substrate; and
   an alumina scale on a surface of the overlay coating;
   wherein the overlay coating consists of aluminum, silicon, and at least one of niobium, titanium, hafnium, and chromium, and the coating consists essentially of about 40 to about 90 volume percent of $M(Al,Si)_3$ intermetallic phase, about 5 to about 40 volume percent of $M_5(Al,Si)_3$ intermetallic phase, and about 1 to about 25 volume percent of $M_3Si_5Al_2$ intermetallic phase, where M is niobium, titanium, hafnium, and/or chromium.

11. The gas turbine engine component according to claim 10, wherein the coating consists essentially of about 50 to about 90 volume percent of the $M(Al,Si)_3$ intermetallic phase, about 5 to about 30 volume percent of the $M_5(Al,Si)_3$ intermetallic phase, and about 1 to about 20 volume percent of the $M_3Si_5Al_2$ intermetallic phase.

12. The gas turbine engine component according to claim 10, wherein the coating intimately contacts a surface of the substrate.

13. The gas turbine engine component according to claim 10, wherein the monolithic niobium-based alloy has a composition consisting of, by weight, up to 5% aluminum, up to 1% carbon, up to 5% cobalt, up to 20% chromium, up to 5% iron, up to 10% hafnium, up to 3% manganese, up to 15% molybdenum, up to 0.2% silicon, up to 30% tantalum, up to 20% titanium, up to 8% vanadium, up to 15% tungsten, and up to 10% zirconium, up to 5% of a rare earth element, up to 25% of a platinum group metal, the balance niobium and incidental impurities.

14. A coating capable of promoting the oxidation resistance of a surface of a niobium-based substrate, the coating consisting of $M(Al,Si)_3$ intermetallic phase and at least one additional intermetallic phase chosen from the group consisting of $M_5(Al,Si)_3$ and $M_3Si_5Al_2$, where M is niobium, titanium, hafnium, and/or chromium.

15. The coating according to claim 14, wherein the coating consists of up to about 90 volume percent of the $M(Al,Si)_3$ intermetallic phase, about 0 to about 50 volume percent of the $M_5(Al,Si)_3$ intermetallic phase, and about 0 to about 30 volume percent of the $M_3Si_5Al_2$ intermetallic phase.

16. The coating according to claim 14, wherein the coating consists of about 40 to about 90 volume percent of the $M(Al,Si)_3$ intermetallic phase, about 5 to about 40 volume percent of the $M_5(Al,Si)_3$ intermetallic phase, and about 1 to about 25 volume percent of the $M_3Si_5Al_2$ intermetallic phase.

17. The coating according to claim 14, wherein the coating consists of about 50 to about 90 volume percent of the $M(Al,Si)_3$ intermetallic phase, about 5 to about 30 volume percent of the $M_5(Al,Si)_3$ intermetallic phase, and about 1 to about 20 volume percent of the $M_3Si_5Al_2$ intermetallic phase.

* * * * *